Figure 1:
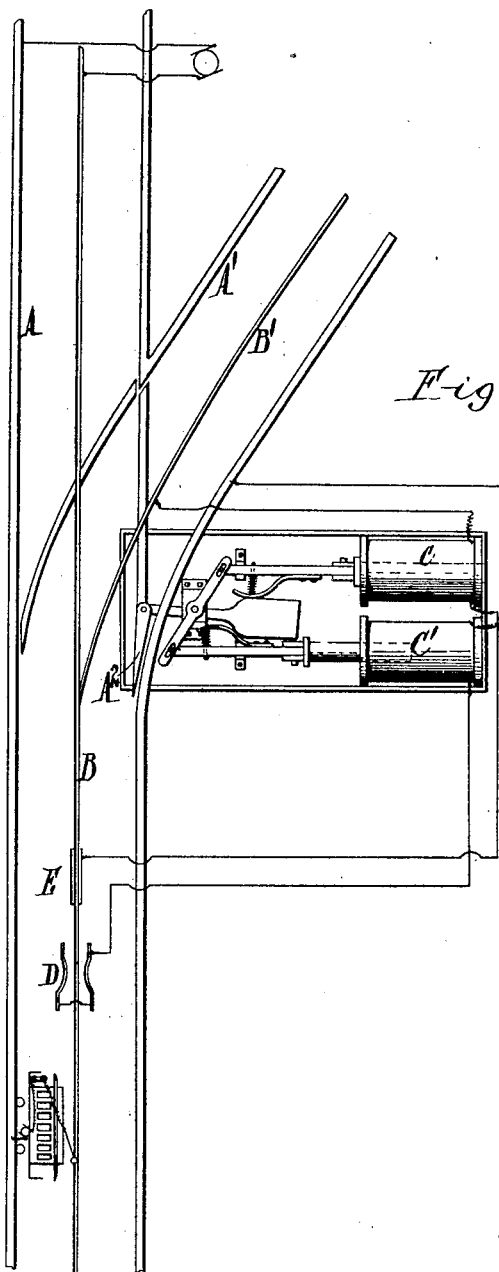

A. A. ROTH.
TROLLEY WHEEL SHIELD.
APPLICATION FILED MAR. 23, 1908.

913,168.

Patented Feb. 23, 1909.
2 SHEETS—SHEET 1.

Witnesses:
Richard Sommer.
Gustav W. Nora.

Alice A. Roth,
Inventor
by Geyer & Popp
Attorneys.

A. A. ROTH.
TROLLEY WHEEL SHIELD.
APPLICATION FILED MAR. 23, 1908.
913,168.
Patented Feb. 23, 1909.
2 SHEETS—SHEET 2.
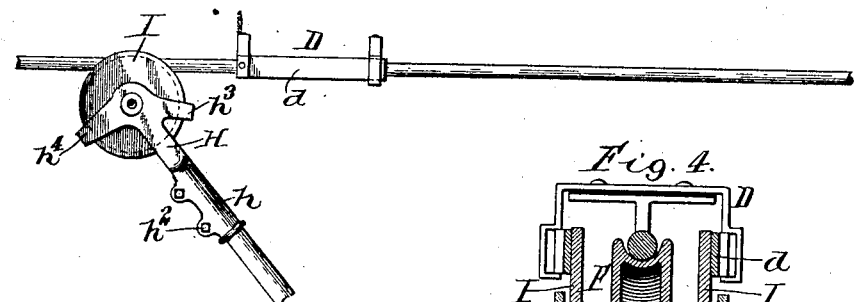
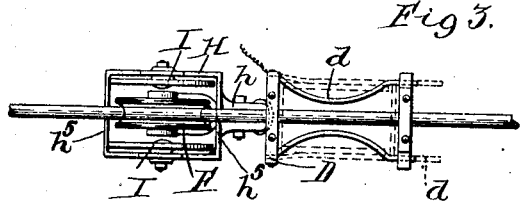
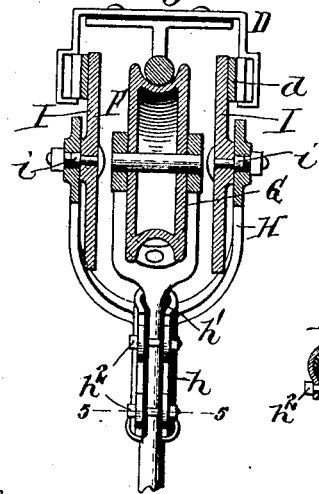
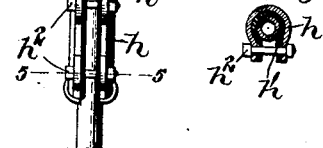
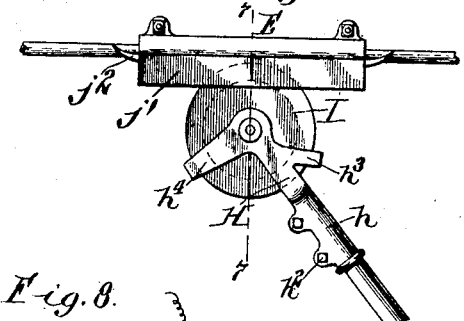
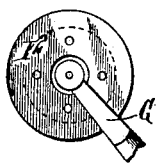
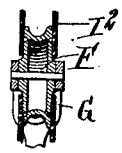
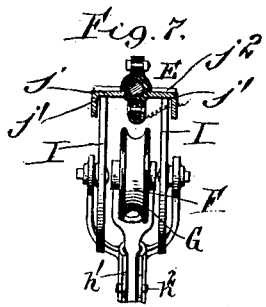
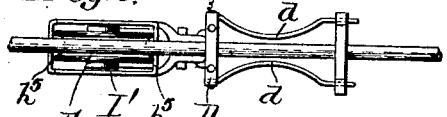

UNITED STATES PATENT OFFICE.

ALICE A. ROTH, OF BUFFALO, NEW YORK.

TROLLEY-WHEEL SHIELD.

No. 913,168.  Specification of Letters Patent.  Patented Feb. 23, 1909.

Application filed March 23, 1908. Serial No. 422,599.

*To all whom it may concern:*

Be it known that I, ALICE A. ROTH, a citizen of the United States, residing at Buffalo, in the county of Erie and State of New York, have invented a new and useful Improvement in Trolley-Wheel Shields, of which the following is a specification.

This invention relates to electric railway switches of the class in which the operating circuits of the switch point are controlled by the trolley wheel of the car which engages successively a pair of contacts mounted on the trolley-wire or conductor and forming terminals of said circuits, the latter including the customary electro-magnets for throwing the switch point in opposite directions. A switch of this character is shown and described in Letters Patent of the United States No. 868,222, granted to me October 15, 1907.

When cars are run with one or more trailers, the trolley wheels of the trailers, unless lowered to their inoperative positions, are liable to misplace the switch point after the same has been properly thrown by the trolley wheel of the leading car and the latter has passed the switch. When this occurs, the leading car continues in its course, while the trailer or trailers are switched onto the side track, or the rear truck of the front car runs onto the siding, rendering the couplings and other parts of the cars liable to be injured or broken and endangering the lives of pedestrians.

The object of my invention is the provision of a shield or guard-device of simple construction which may be applied to the trolley wheels of trailers, so that such wheels while ordinarily free to run in contact with the conductor in the usual manner, will be held or moved out of engagement with the switch-contacts of the conductor in passing them, thus preventing the trolley wheels of the trailers from affecting the switch and placing the latter wholly under the control of the leading car.

In the accompanying drawings consisting of two sheets: Figure 1 is a diagrammatic top plan view of a section of an electric railway of the type with which my improved trolley-wheel guard coöperates. Fig. 2 is an enlarged side elevation of the trolley-wire, one of its switch-contacts and a trolley-pole equipped with the guard. Fig. 3 is a top plan view of said parts. Fig. 4 is a transverse section of the same parts, on an enlarged scale, showing the guard-wheels in engagement with said contact. Fig. 5 is a cross section in line 5—5, Fig. 4. Fig. 6 is an enlarged side elevation of the other switch-contact of the trolley wire and the trolley pole and wheel. Fig. 7 is a cross section in line 7—7, Fig. 6. Fig. 8 is a side elevation of a modified construction of the trolley-wheel guard. Fig. 9 is a top plan view of said modification. Fig. 10 is a side elevation of a trolley-wheel embodying another modified construction of the improvement. Fig. 11 is a central cross section thereof.

Similar letters of reference indicate corresponding parts throughout the several views.

A indicates the rails of the main track, A¹ the rails of the side track, A² the switch-point or tongue, and B, B¹ the trolley wires of the main and side tracks.

The mechanism for operating the switch point forms no part of my present invention. The mechanism herein shown, is by way of example only, and is substantially like that shown and described in the Letters Patent hereinbefore mentioned, to which reference is made for a full description thereof.

Referring to Fig. 1, C, C¹ indicate the two electro-magnets which shift the switch-tongue in opposite directions and which are included in circuits formed partly by the trolley system, as described in said Letters Patent. D indicates the trolley-wire contact forming a terminal of the circuit of the magnet C¹, and E the trolley-wire contact forming a terminal of the circuit of the magnet C. As more fully explained in the aforesaid Letters Patent, the usual trolley wheel F enters between the bow-springs *d* of the insulated contact D and bridges the same, carrying the current from the trolley wire directly to the circuit of the magnet C¹ and energizing it; while the other insulated contact E is engaged on its underside by the passing trolley-wheel, so that the current which energizes the other magnet C passes through the motor-circuit of the car and is under the control of the motorman. G indicates the customary fork or harp of the trolley pole in which the trolley wheel F is journaled.

Referring to the embodiment of the invention shown in Figs. 2, 3 and 4, H indicates a frame or yoke removably secured to the trolley pole and extending around the bottom and sides of the harp. In the construction shown, the yoke is provided at its lower end with a split sleeve $h$ embracing the trolley pole and insulated therefrom by a bushing $h^1$ and having clamping bolts $h^2$. To stiffen the yoke, it is preferably provided at its upper end on opposite sides of the trolley wheel with front and rear arms $h^3$, $h^4$ extending beyond the periphery of the trolley wheel and connected by cross pieces $h^5$.

I, I indicate shields or guards arranged on opposite sides of the trolley wheel, and preferably consisting of narrow wheels mounted on horizontal studs $i$ carried by the sides of the yoke H and arranged in line with the axle of the trolley wheel, as best shown in Fig. 4. These guard wheels may be made of insulating material, such as vulcanized fiber, or of metal, in which latter case the yoke H should be insulated from the trolley pole, as shown, or they may be of any other suitable material. The guard wheels may be as large or larger in diameter than the trolley wheel, so that when a trolley wheel equipped with such guard wheels passes a trolley-wire contact, such as D, the guard wheels enter between the contact springs $d$ and roll along them, shielding the trolley-wheel against contact with said springs and preventing it from carrying current from the trolley-wire to the contact D. By this construction, the shielded trolley wheel of a trailer, though remaining against the trolley wire is deprived of its switching function, leaving the electro-magnet of the corresponding switch-circuit unaffected by the said trolley wheel and keeping it solely under the control of the leading car whose trolley wheel has no such guards or shields and is free to make contact with the springs $d$.

As before mentioned, the trolley-wire contact E receives current through the trolley-pole. In order to prevent the trolley-wheel of a trailer from closing the corresponding switch-circuit and misplacing the switch-point before the trailer has passed the switch, the contact E is provided at opposite sides with laterally extending rails $j$ against the undersides of which the guard-wheels I are adapted to run, thereby lowering the trolley-wheel out of contact with the trolley wire while passing said contact, as shown in Fig. 7, and preventing the trolley wheel from affecting said switch-circuit. To effect this result, the guard-wheels I are sufficiently larger in diameter than the trolley wheel. They are preferably so large that they depress the trolley-wheel flanges some distance below the contact E, as shown in Fig. 7. In order to prevent the trolley wheel when thus depressed, from shifting laterally out of alinement with the trolley-wire, the rails $j$ are preferably provided with depending flanges or guards $j^1$, which keep the trolley wheel properly centered, so as to rise against the trolley wheel upon passing the contact E.

To prevent shock and injury to the guard wheels, the rails $j$ of the contact E are curved upward at their ends to form guides or deflectors $j^2$.

It will be understood from the foregoing that such trolley-shields or guards are applied only to the trolley poles of trailers, and that the trolley wheel of the leading car of the train may be of ordinary construction and is free to engage the contacts D and E for automatically closing the switch-circuits containing the operating magnets C, $C^1$ of the switch-point.

While the trolley-wheel shields preferably consist of wheels or rollers, their construction may be modified without departing from the scope or spirit of the invention. For example, as shown in Figs. 8 and 9, fixed shields or cheek pieces $I^1$ may be substituted for the guard wheels I. In this case, the cheek pieces may be secured to or formed integral with the yoke $H^1$. In passing the contact D, the sides of these cheek pieces slide along the inner sides of the springs $d$; while in passing the contact E, the upper edges of the cheek-pieces slide along the undersides of the rails $j$.

This improved shield can be readily applied to and removed from a trolley pole, its construction is compact, and it does not materially increase the weight of the pole.

If desired, the shields may be applied directly to the trolley-wheel, as shown at $I^2$ in Figs. 10 and 11, producing a shielded trolley-wheel designed especially for trailers. In this case, the shields consist of disks or annular plates riveted or otherwise secured to opposite sides of the trolley-wheel and projecting a suitable distance beyond the flanges of the wheel. These shields may be of vulcanized fiber or other non-conductive material, or of metal suitably insulated from the trolley-wheel.

I claim as my invention:

1. The combination of a trolley-wheel, and means for shielding the wheel from engagement with contacts of the trolley-wire, substantially as set forth.

2. The combination of a trolley-wheel, and shielding members arranged on opposite sides of the wheel, substantially as set forth.

3. The combination with a trolley-pole and a trolley-wheel, of a support removably mounted on the pole, and means carried by said support for shielding the trolley wheel from engagement with contacts of the trolley-wire, substantially as set forth.

4. The combination with a trolley-pole and a trolley wheel, of a support removably mounted on the pole and shields arranged on opposite sides of the trolley wheel and mounted on said support, substantially as set forth.

5. The combination of a trolley-wheel, and shielding wheels arranged on opposite sides thereof, substantially as set forth.

6. The combination of a trolley wheel, and shielding wheels of larger diameter than the trolley-wheel arranged on opposite sides thereof, substantially as set forth.

7. The combination of a trolley pole and a trolley-wheel, of a frame attached to the trolley-pole, and upright shielding wheels journaled on said frame on opposite sides of the trolley-wheel, substantially as set forth.

8. The combination of a trolley pole and a trolley-wheel, of a frame removably attached to the pole, studs mounted in said frame on opposite sides of the trolley wheel and in line with the axle thereof, and shielding wheels journaled on said studs, substantially as set forth.

9. A trolley-wheel shield, comprising a frame adapted to be attached to a trolley-pole, and guard-members arranged on said frame and spaced to receive a trolley-wheel between them, substantially as set forth.

10. A trolley-wheel shield, comprising a frame adapted to be attached to a trolley-pole, and guard-members arranged on said frame and spaced to receive a trolley-wheel between them, said members being of larger diameter than the trolley wheel, substantially as set forth.

11. A trolley-wheel shield, comprising a frame adapted to be attached to a trolley-pole, and guard-wheels journaled on opposite sides of said frame, substantially as set forth.

12. A trolley-wheel shield, comprising a frame having means for removably securing it to a trolley-pole, and upright guard-wheels journaled in opposite sides of said frame and spaced to admit a trolley-wheel between them, substantially as set forth.

Witness my hand this 17th day of March, 1908.

ALICE A. ROTH.

Witnesses:
C. F. GEYER,
E. M. GRAHAM.